US012391470B2

(12) United States Patent
Rimsa

(10) Patent No.: US 12,391,470 B2
(45) Date of Patent: Aug. 19, 2025

(54) KICKBAR ASSEMBLY

(71) Applicant: Perkins Manufacturing Co., Bolingbrook, IL (US)

(72) Inventor: James Rimsa, Shorewood, IL (US)

(73) Assignee: Perkins Manufacturing Co., Bolingbrook, IL (US)

(*) Notice: Subject to any disclaimer, the term of this patent is extended or adjusted under 35 U.S.C. 154(b) by 369 days.

(21) Appl. No.: 18/315,687

(22) Filed: May 11, 2023

(65) Prior Publication Data

US 2024/0375862 A1 Nov. 14, 2024

(51) Int. Cl.
*B65F 3/04* (2006.01)

(52) U.S. Cl.
CPC .................................... *B65F 3/041* (2013.01)

(58) Field of Classification Search
CPC ....................................................... B65F 3/041
See application file for complete search history.

(56) References Cited

U.S. PATENT DOCUMENTS 5,425,613 A 6/1995 Osborn
6,224,317 B1 * 5/2001 Kann ...................... B65F 3/041 414/408
7,273,340 B2 * 9/2007 Arrez ...................... B65F 3/041 414/421
9,561,904 B1 2/2017 Osborn
11,414,267 B2 * 8/2022 Rocholl .................. F16H 19/08
11,505,404 B2 * 11/2022 Rocholl ................ B65F 3/0203
12,129,112 B2 * 10/2024 Giere ...................... B65F 3/041
2023/0029433 A1 * 1/2023 Bivens .................... B65F 3/208

* cited by examiner

*Primary Examiner* — Jonathan Snelting
(74) *Attorney, Agent, or Firm* — Cook Alex Ltd.

(57) ABSTRACT

A kickbar assembly for use in lifting and dumping a refuse container into a hopper of a rear load refuse vehicle, the kickbar assembly comprising: a pair of base frames configured to be connected to side walls of the refuse vehicle, an elongated generally U-shaped lifting implement having a pair of opposed ends pivotably connected to the respective base frames, a pair of electrically powered linear actuators, each of the linear actuators being pivotably connected to one of the respective base frames and one of the respective opposed ends of the lifting implement, the lifting implement being pivotably connected to the base, wherein the linear actuators move the lifting implement from a refuse container engaging lower position to an upper position to dump contents from the refuse container into the hopper, and further move the lifting implement to the lower position to return the refuse container to the ground surface.

24 Claims, 13 Drawing Sheets

KICKBAR ASSEMBLY

BACKGROUND

Field of the Disclosure

The present disclosure relates to lifting devices for rear load refuse vehicles. More particularly, the present disclosure relates to improved kickbar assembly apparatus and methods of use, including electrically powered kickbar assemblies for use in lifting and dumping refuse containers.

Description of Related Art

Various lifting devices have been utilized for lifting refuse containers to dump such containers, typically into a refuse collection vehicle, such as may be commonly referred to as a refuse vehicle or garbage truck. Such lifting devices permit lifting of larger containers that are too large to be handled manually by a refuse vehicle operator.

Those familiar with refuse vehicles know that an operator may dump large bins from commercial refuse generators into a rear hopper that defines a refuse collection cavity. Larger bins are handled with the help of a cable and winch or reeve cylinder. Somewhat smaller refuse containers, such as steel bins that typically range in size from 1.5 cubic yards to 4 cubic yards are frequently serviced by using a "kickbar" assembly. The kickbar assembly essentially is used to tilt a refuse container and in so doing, to lift and dump the refuse container into the hopper of a rear load refuse vehicle. A kickbar assembly can lift and dump containers faster than would be possible with a winch, and depending on the configuration, a kickbar assembly also can lift and dump smaller bins.

There are many variations of kickbar assemblies, however, they utilize hydraulic power provided by systems on a refuse vehicle. Such hydraulic kickbar assemblies enable an operator to conveniently position a kickbar assembly that is in a lower position to be adjacent a refuse container on the ground surface. The operator then may operate a lever to cause the kickbar assembly to move to an upper position, thereby lifting and dumping the contents of the refuse container into the hopper of the rear load refuse vehicle. Upon further movement of the lever, the kickbar assembly returns the refuse container to the ground surface.

SUMMARY

The disclosure pertains to improved kickbar assemblies that are electrically powered. The kickbar assemblies of the present disclosure may be configured and used to lift and dump refuse containers into a refuse collection cavity defined by a hopper that is integrated into or carried by a refuse vehicle. The kickbar assemblies are configured to be connected to side walls of a rear load refuse vehicle. If a refuse vehicle is fossil fueled and has hydraulic systems, the electrically powered kickbar assemblies will advantageously forego requiring some of the hydraulic systems to be dedicated to operating a hydraulically powered kickbar assembly. The electrically powered kickbar assemblies also may be installed on refuse vehicles that are partially hydraulically powered, or installed on refuse vehicles that are exclusively electrically powered, thereby eliminating the need for hydraulic capacity altogether. The kickbar assemblies utilize a DC electrical power source, whether provided via a dedicated battery, a vehicle battery or other electrical power generating system.

As disclosed herein, the kickbar assemblies of the present disclosure are electrically powered and utilize a linear actuator, which should permit a relatively reliable and compact configuration. The kickbar assemblies have at least a lower position and an upper position for dumping a refuse container.

The present disclosure provides several aspects of the subject matter which may be embodied separately or together in the devices and systems described and claimed herein. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a kickbar assembly is provided for use in lifting and dumping a refuse container into a hopper of a rear load refuse vehicle, the kickbar assembly comprising: a pair of base frames configured to be connected to side walls of the refuse vehicle, an elongated generally U-shaped lifting implement having a pair of opposed ends pivotably connected to the respective base frames, a pair of electrically powered linear actuators, each of the linear actuators being pivotably connected to one of the respective base frames and one of the respective opposed ends of the lifting implement, the lifting implement being pivotably connected to the base, wherein the linear actuators move the lifting implement from a refuse container engaging lower position to an upper position to dump contents from the refuse container into the hopper, and further move the lifting implement to the lower position to return the refuse container to the ground surface.

BRIEF DESCRIPTION OF DRAWINGS

In describing the preferred example embodiments, reference is made to the accompanying drawing figures wherein like parts have like reference numerals, and wherein.

It should be understood that the drawings are not necessarily to scale, with some views enlarged for enhanced viewing. While some details of the example kickbar lifting devices, including details of fastening means and other plan and section views of the particular components may not be shown, such details are considered to be within the comprehension of those skilled in the art in light of the present disclosure. It also should be understood that the present disclosure and claims are not limited to the preferred embodiments illustrated.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Referring generally to FIGS. 1-16, it will be appreciated that kickbar assemblies of the present disclosure may be embodied in numerous configurations and for connection to various rear load refuse vehicles. For example, the kickbar assemblies may be connected to sides of a refuse vehicle. The teachings within this disclosure pertain to use of electrically powered linear actuators that may be used in kickbar assemblies having various container engaging configurations selected to lift and dump specific types of refuse containers into a hopper defining a refuse collection cavity that is carried by or integrated into a rear load refuse vehicle.

For instance, FIGS. 1-8 and 10 illustrate an example embodiment of a kickbar assembly 10 for use in lifting and dumping a refuse container 12 having a trunnion bar. This is the case with an ANSI Type "T" refuse container 12, shown in FIGS. 9A-9C, including perspective, front and side views, and in FIG. 10 wherein the refuse container 12 is being dumped. In this example, the kickbar assembly 10 is connected to sides of a refuse vehicle V. The refuse vehicle V includes a hopper H. In this example, the hopper H is incorporated into a refuse vehicle V and defines a collection cavity C. The kickbar assembly 10 is located so as to lift and dump the refuse container 12 over a rear sill S of the hopper H, at the rear of the rear load refuse vehicle V, which may be otherwise referred to as a garbage truck.

Figure 1:
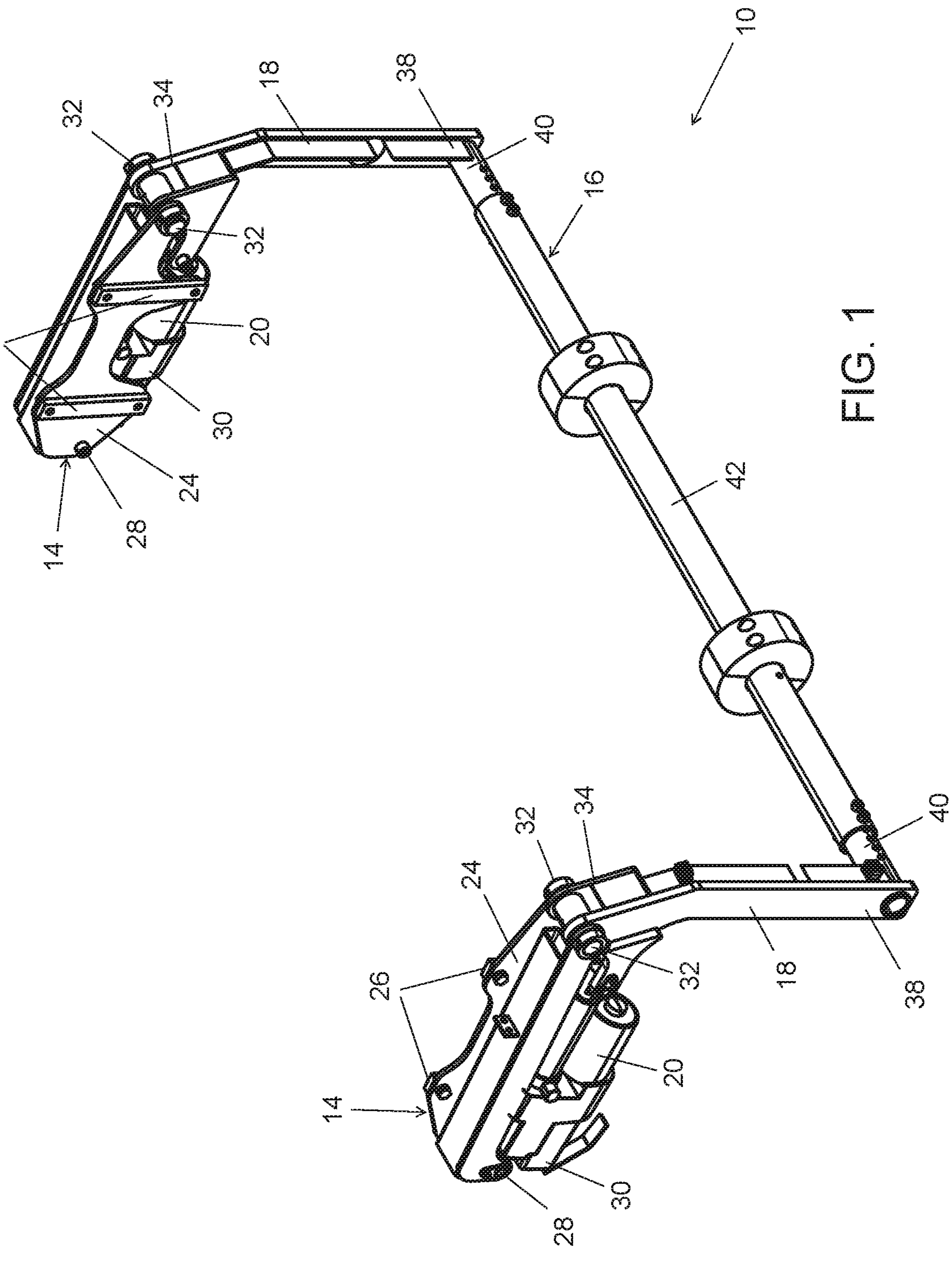
FIG. 1 is a rear perspective view illustrating an example kickbar assembly having an electrically driven linear actuator and in a lower position.
Figure 2:
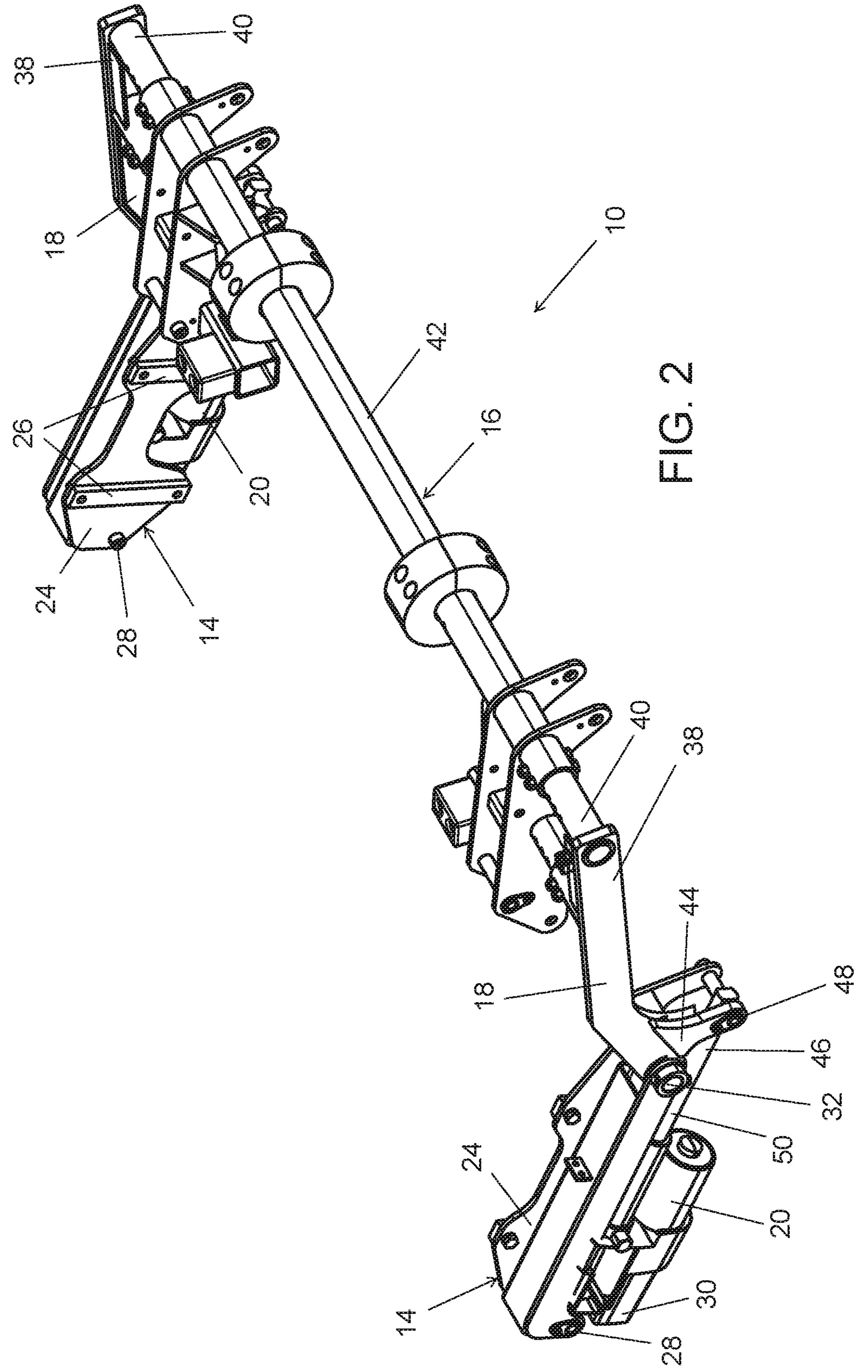
FIG. 2 is a rear perspective view of the example kickbar assembly of FIG. 1 in an upper position and with optional additional hook mounting structure.
Figure 3:
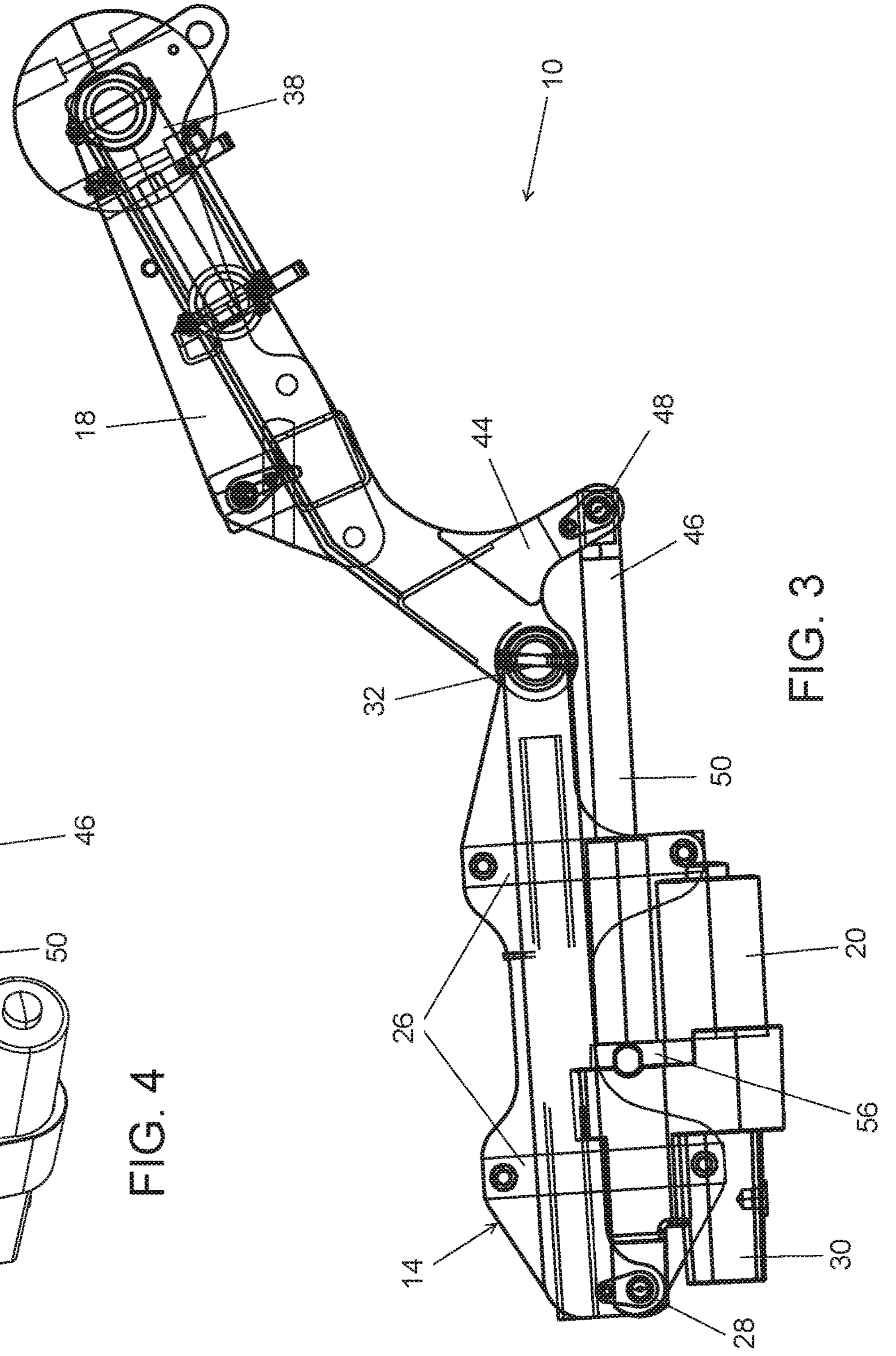
FIG. 3 is a side view of the example kickbar assembly of FIG. 2 in an upper position.
Figure 8:
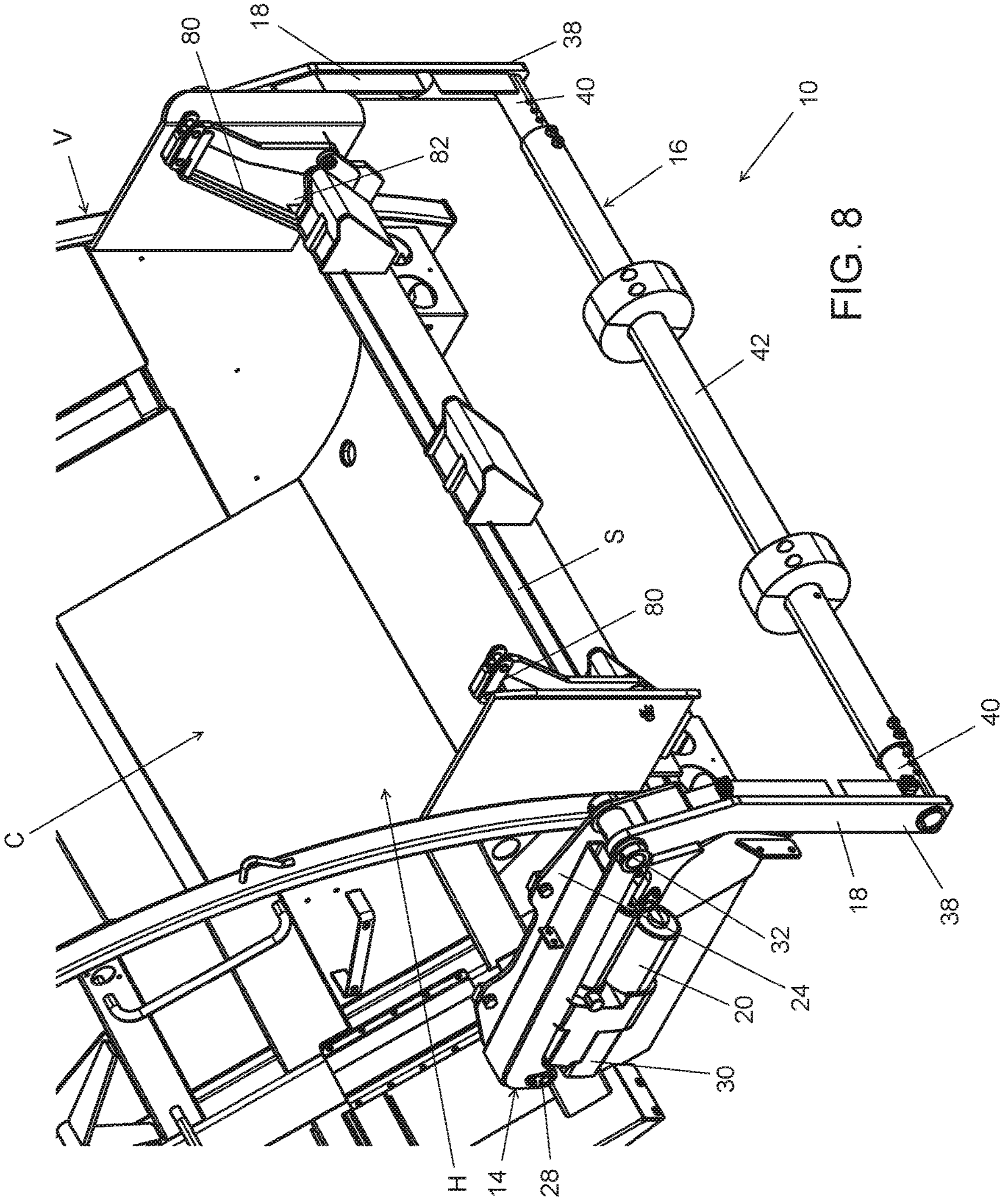
FIG. 8 is a rear perspective view of the example kickbar assembly of FIG. 1 installed on a rear tailgate of a refuse collection vehicle and with the kickbar assembly in a lower position.

The example kickbar assembly 10 for use in lifting and dumping a refuse container 12 into a hopper H of a rear load refuse vehicle V, includes a pair of base frames 14 configured to be connected to side walls SW of the refuse vehicle V. The kickbar assembly 10 includes an elongated generally U-shaped lifting implement 16 having a pair of opposed ends 18 pivotably connected to the respective base frames 14, and a pair of electrically powered linear actuators 20. Each of the linear actuators 20 is pivotably connected to one of the respective base frames 14 and one of the respective opposed ends 18 of the lifting implement 16. The lifting implement 16 is pivotably connected to the base 14, wherein the linear actuators 20 move the lifting implement 16 from a refuse container engaging lower position, as seen in FIGS. 1 and 8, to an upper position, seen in FIGS. 2, 3 and 10, to dump contents from the refuse container 12 into the hopper H, and further move the lifting implement 16 to the lower position to return the refuse container 12 to the ground surface.

Each base frame 14 further includes an inner mounting plate 24 removably mounted to the side wall SW of the refuse vehicle V. In this example, vertical mounts 26 may be welded to the side walls SW of the refuse vehicle V and may include apertures to permit the base frames 14 to be removably connected thereto, such as by use of mechanical fasteners. Each inner mounting plate 24 also is pivotably connected at 28 to a front end 30 of the linear actuator 20 and pivotably connected at 32 to a proximal end 34 of an opposed end 18 of the lifting implement 16.

Each base frame 14 of the kickbar assembly 10 also includes an outer mounting plate 36 that is pivotably connected at 28 to the front end 30 of the linear actuator 20 and pivotably connected to the proximal end 34 of the opposed end 18 of the lifting implement 16. In the present example kickbar assembly 10, each base frame 14 comprises a weldment, meaning a unit formed by welding together an assembly of parts. It will be appreciated that the base frame alternatively could be constructed by having individual parts fastened together via other suitable means of connection, such as by use of mechanical fasteners or the like.

Each opposed end 18 of the lifting implement 16 further comprises a beam pivotably connected at a proximal end 34 to one of the respective base frames 14 and having a distal end 38 fixedly connected to an end 40 of an elongated member 42. Each beam at one of the opposed ends 18 of the lifting implement 16 includes an extension arm 44 located between the proximal and distal ends 34, 38 of the respective beam. In this example, a rear end 46 of the linear actuator 20 is pivotably connected at 48 to the extension arm 44 of the beam, wherein the rear end 46 of the actuator 20 includes the rear end of a movable rod 50.

From the above description of the opposed ends 18 of the lifting element 16, it follows that each opposed end 18 of the lifting implement 16 having a beam is pivotably connected at 32 at a proximal end 34 to one of the respective base frames 14 and has a distal end 38 fixedly connected to an end 40 of an elongated member 42. It will be appreciated that various types of electrically powered linear actuators may be used, for example, the electrically powered actuator of this example kickbar assembly 10 includes a ball screw linear actuator.

Figure 4:
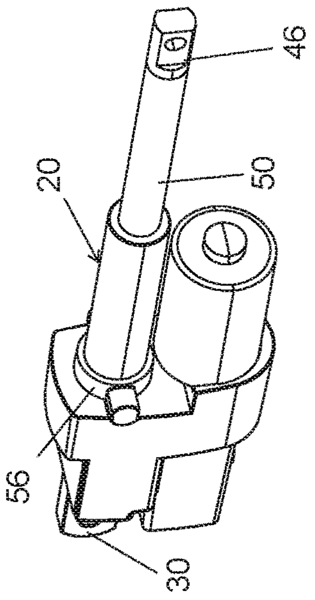
FIG. 4 is a perspective view of an electrically powered linear actuator utilized in the example kickbar assembly.
Figure 6:
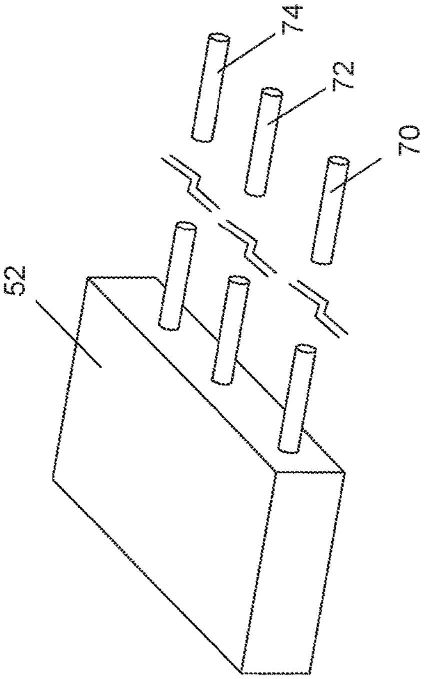
FIG. 6 is a diagrammatic view of an example controller enclosure for use in operating the example kickbar assembly.
Figure 7:
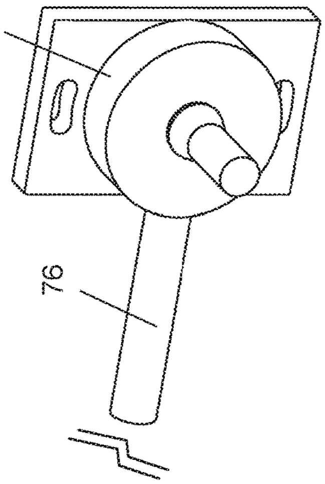
FIG. 7 is a diagrammatic perspective view of an example position sensor that indicates the position of the example kickbar assembly to the controller.

An electrical control system for operating the kickbar assembly 10 includes a controller 52 and an operator interface 54. The operator interface 54 is used by an operator to input commands. The operator interface 54 may be connected to the refuse vehicle V, to be in a convenient location to be utilized by the operator who is responsible for operating the kickbar assembly 10. The electrical control system also includes a position sensor 56, shown in FIG. 7, which determines the position of the lifting implement 16 relative to the base frame 14 during operation of the kickbar assembly 10. As best seen in FIG. 4, the position sensor 56 is connected to the linear actuator 20.

Figure 5:
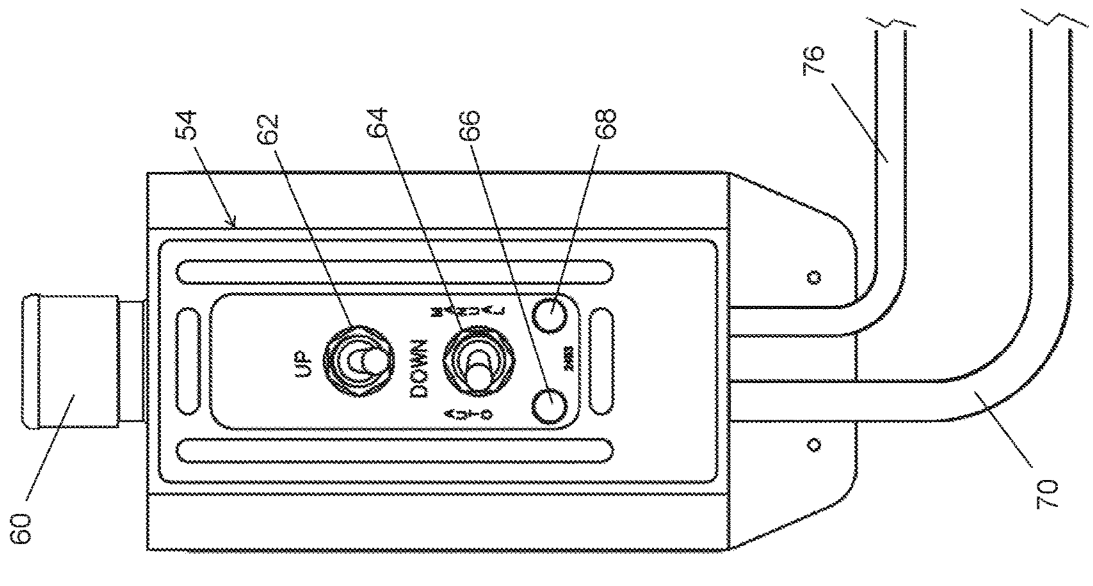
FIG. 5 is a perspective view of an exemplary operator interface for operating the example kickbar assembly.

The controller 52 of the electrical control system includes a protective enclosure that contains a logic circuit and processor, such as a microprocessor or the like. The operator interface 54 includes a plurality of electrical inputs, such as switches, buttons, and the like, associated with controlling the kickbar assembly 10. As seen in FIG. 5, the electrical inputs in the present example include a safety energy Stop button 60 atop the operator interface 54, with a switch 62 having an Up position and a Down position, and a Manual/Automatic operating mode switch 64, which are associated with movement of the lifting implement 16. The operator interface 54 also may include indicator lights 66, 68 which may be configured to confirm the operational modes, movements and/or positions of the lifting implement 16.

The operator input commands entered into the operator interface 54 are provided to the controller 52 via a cable or wiring 70, an example of which is shown in FIG. 5. It also will be appreciated that such commands alternatively may be provided wirelessly. The controller 52 is part of the electrical control system and receives and processes the operator input commands to operate the kickbar assembly 10. The controller 52 includes an enclosure and may be mounted on or inside of the refuse vehicle V, remotely from the kickbar assembly 10, to be protected from physical or environmental hazards.

As noted, the kickbar assembly 10 includes operator electrical inputs that include at least one switch 64 to select between at least a manual mode of operation and an automatic mode of operation. The electrical control system further includes a one-touch operation circuit which provides operation of a kickbar assembly 10 for a lifting and dumping cycle of the lifting implement 16 when in the automatic mode.

The controller 52 may be electrically connected to other system components in the electrical control system by wiring, such as an example power cable 72 for connection to a power source, such as a vehicle or accessory battery. The controller 52 also may be connected to each of the pair of electrically powered linear actuators 20 of the kickbar assembly 10, such as by a control cable 74 connected to first and second electrical linear actuators 20. Depending on the configuration of kickbar assembly 10, the controller 52 may have a additional control cables, as needed.

Each kickbar assembly 10 may use the position sensor 56 as part of the electrical control system and it is electrically connected to the operator interface 54, such as by the cable 76. The position sensor 56 permits the controller 52 to monitor the position of the lifting implement 16 of the kickbar assembly 10. Thus, the controller 52 may use the position sensor 56 and linear actuator 20 to determine the position and movement of the lifting implement 16.

The operating system for the example kickbar assembly 10 is believed to include an electrical control system having a unique controls package. For example, normal control of lifting devices in the refuse removal industry utilizes handles and/or levers that must be manually operated, such as by having an operator move a lever and hold it in a command position, such as to raise a lifting device until it achieves an upper dumping position. The operator then must move and hold the lever until the refuse container is returned to the ground surface.

In contrast, the present operating system for the kickbar assembly 10 permits an operator to select between manual and automatic modes of operation. When the switch 66 is used to select the automatic mode of operation, a one-touch operation circuit is started by actuation of a button associated with an "Up" movement command, wherein the lifting implement 16 is moved from a lower position to lift the refuse container 12 from a ground surface to an upper position to dump the refuse container 12, followed by a pre-selected dwell time in the upper position before returning the refuse container 12 to the ground surface. During the lifting and dumping cycle, the operator may move away from the operator interface 54, while monitoring operation of the kickbar assembly 10. The operating system will automatically control the electrically powered linear actuator 20 to move the lifting implement 16 from the lower position shown in FIG. 8 to the upper position in FIG. 10.

Accordingly, the electrically powered linear actuator 20, in combination with the position sensor 56, the user interface 54 and the logic circuit and processor of the controller 52 provide a unique operator control system having significant advantages. The system remembers set positions by use of the position sensor 56 and the logic circuit and processor of the controller 52. When in the automatic mode of operation and first moving the switch 62 to the Up position, the kickbar assembly 10 may be moved from the lower position for the first lifting and dumping cycle. Thereafter, the kickbar assembly 10 will return to the same lower position and be ready for a different refuse container to be engaged for the next lifting and dumping cycle, which the operator may start by again moving the switch 62 to the Up position. This advantageously permits an operator to avoid the strain on muscles and joints associated with having to hold a lever or handle throughout a lifting and dumping cycle of a kickbar assembly. In addition, it permits the operator to move away and prepare to engage one or more other refuse containers while the kickbar assembly 10 raises the lifting implement 16 to the upper position to dump a container, dwells and then returns to the lower position, placing the container back on the ground surface. This may enable an operator to more quickly service a refuse collection route, especially in dense city environments where the next refuse containers may be only a few steps away.

Using switch 64, the system may be switched to the manual mode of operation. This permits an operator to operate the system manually, without the optional dwell time and automated return to the lower position. This may be desired when needing to make adjustments or corrections. The operator would simply manually move the switch 62 between the Up and Down positions.

Figure 9A:
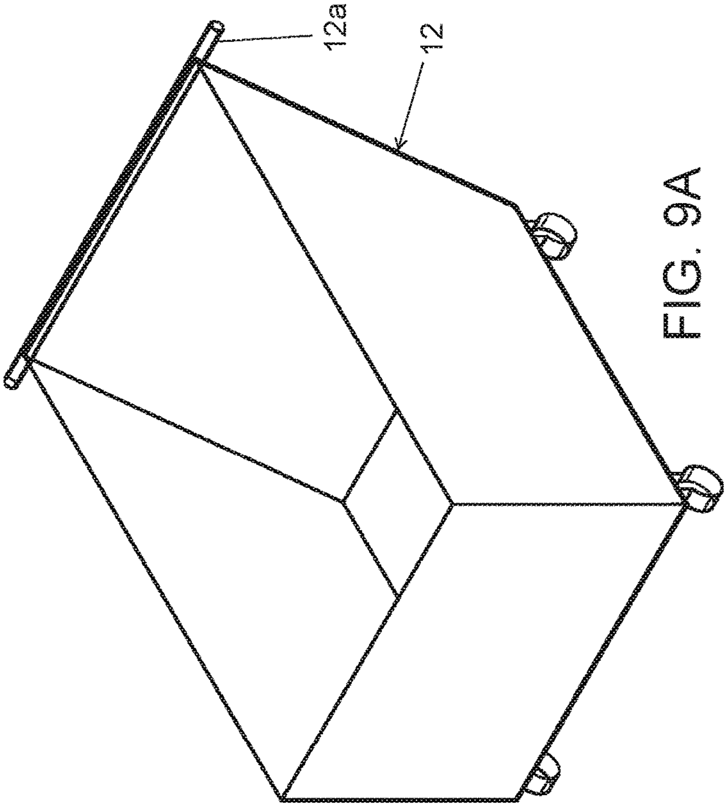
FIGS. 9A-9C are rear perspective, front and side views of a typical ANSI Type "T" container, commonly referred to as a commercial rearload container.
Figure 9C:
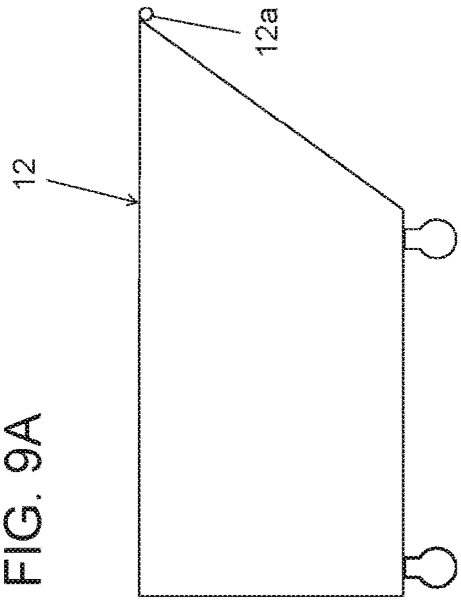
Figure 9B:
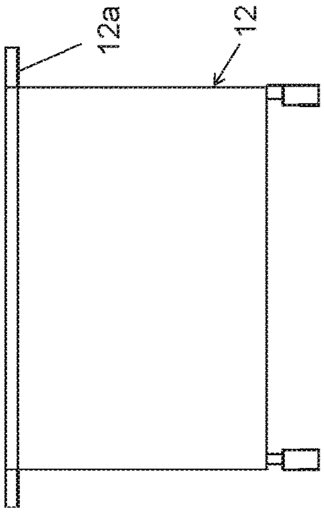
Figure 10:
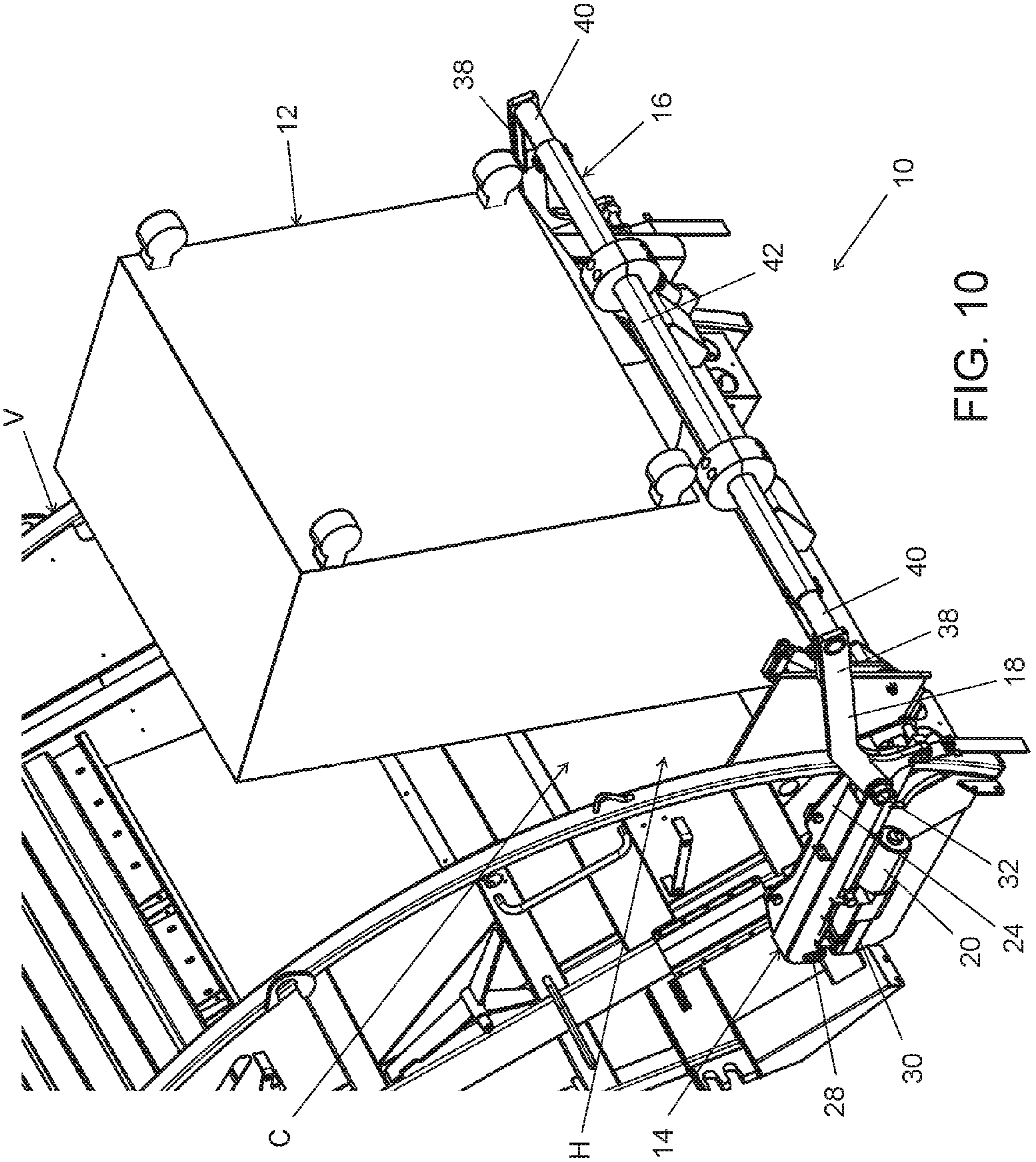
FIG. 10 is a rear perspective view of the ANSI Type T container of FIGS. 9A-9C being dumped, with the kickbar assembly of FIG. 8 in an upper position.

The kickbar assembly 10 may utilize optional components to accommodate a refuse container having a trunnion bar. As seen in FIGS. 9A-9C, an ANSI Type T refuse container includes a trunnion bar **12*a* for use in engaging and controlling the container during a lifting cycle. To utilize the trunnion bar 12*a*, as shown in FIG. 8, the kickbar assembly 10 includes a trunnion bar receiver 80 connected to the refuse vehicle V that receives the trunnion bar 12*a* of the refuse container and guides it to a resting area 82 where it serves as a pivot for the lifting implement 16 to tip the refuse container 12. Thus, when the kickbar assembly 10 is actuated, it tilts the refuse container 12 as the lifting implement 16 is moved to the upper position to dump contents from the refuse container 12**.

Figure 11:
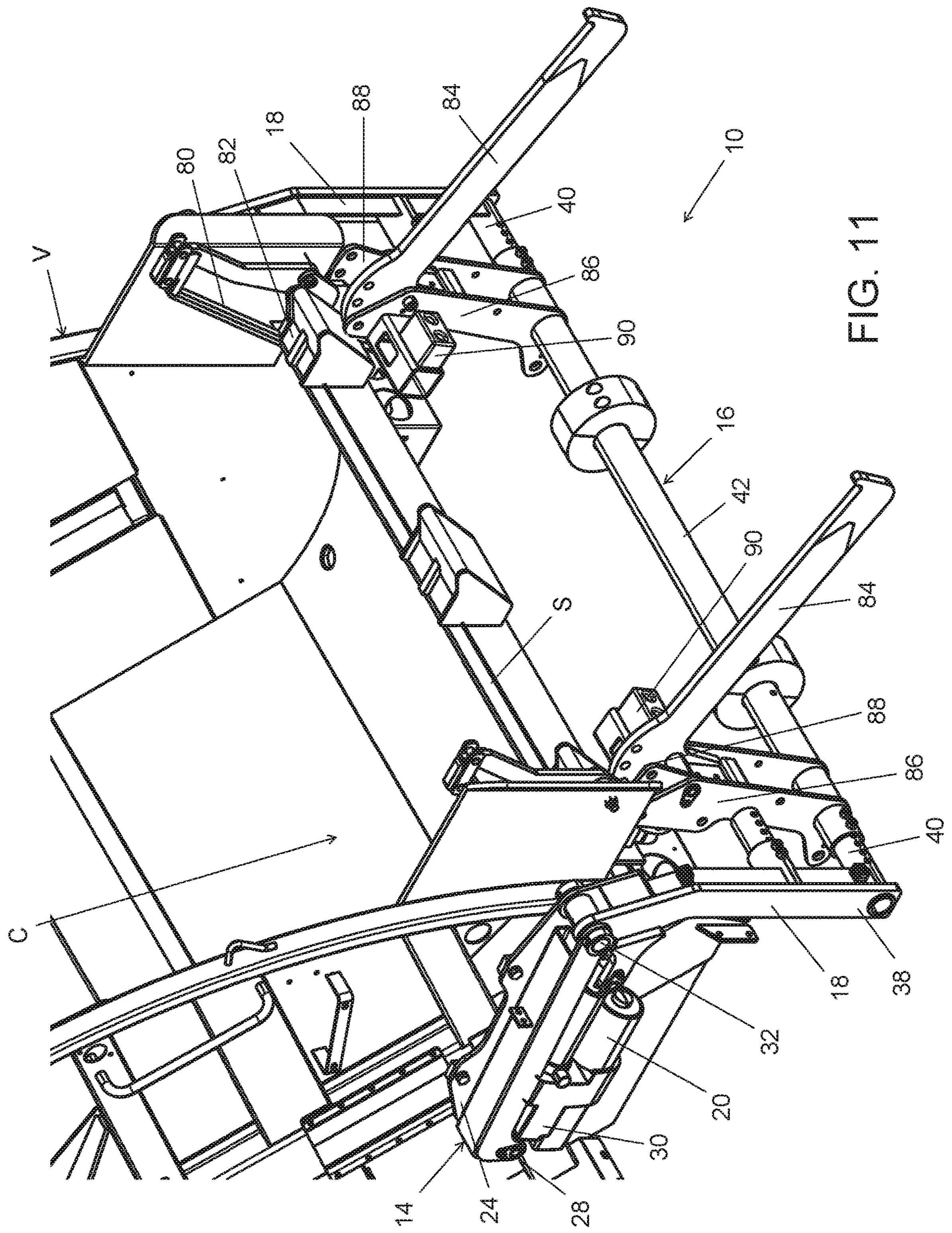
FIG. 11 is a rear perspective view of the example kickbar assembly and rear tailgate of a refuse collection vehicle of FIG. 8, with the kickbar assembly in a lower position and having optional forks for lifting frontload containers.
Figure 12A:
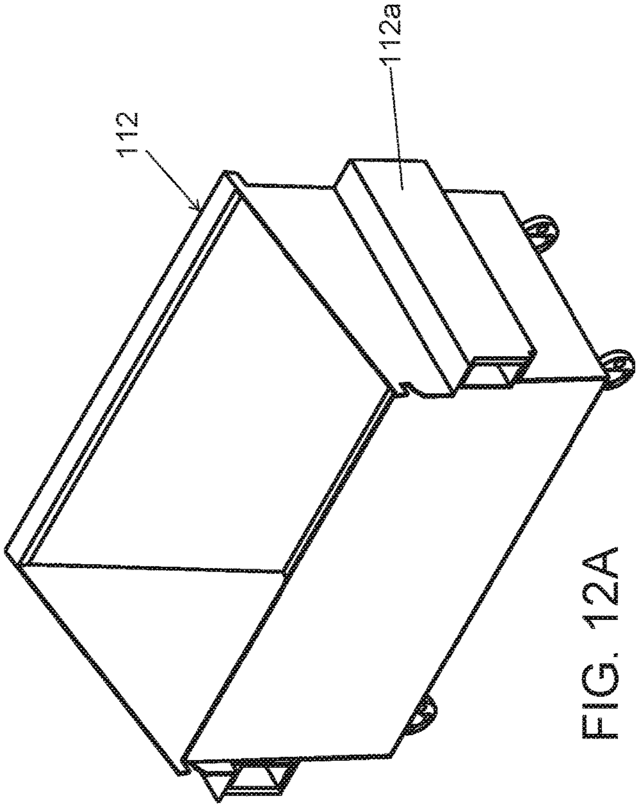
FIGS. 12A-12C are rear perspective, side and rear views of a typical ANSI Type "S" container, commonly referred to as a commercial frontload container.
Figure 12B:
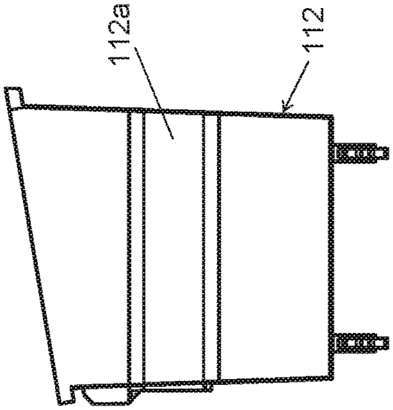
Figure 12C:
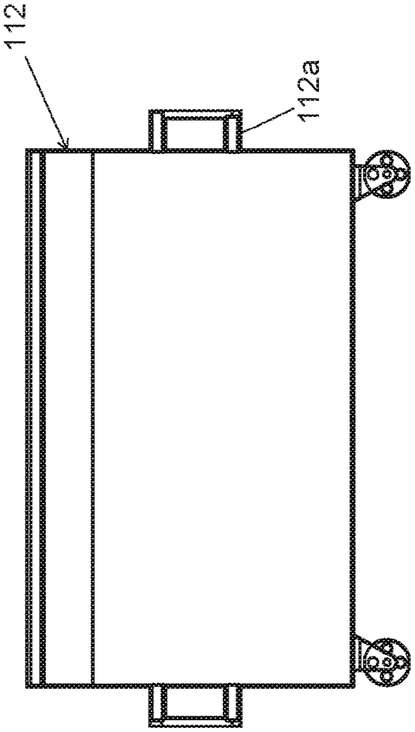
Figure 13:
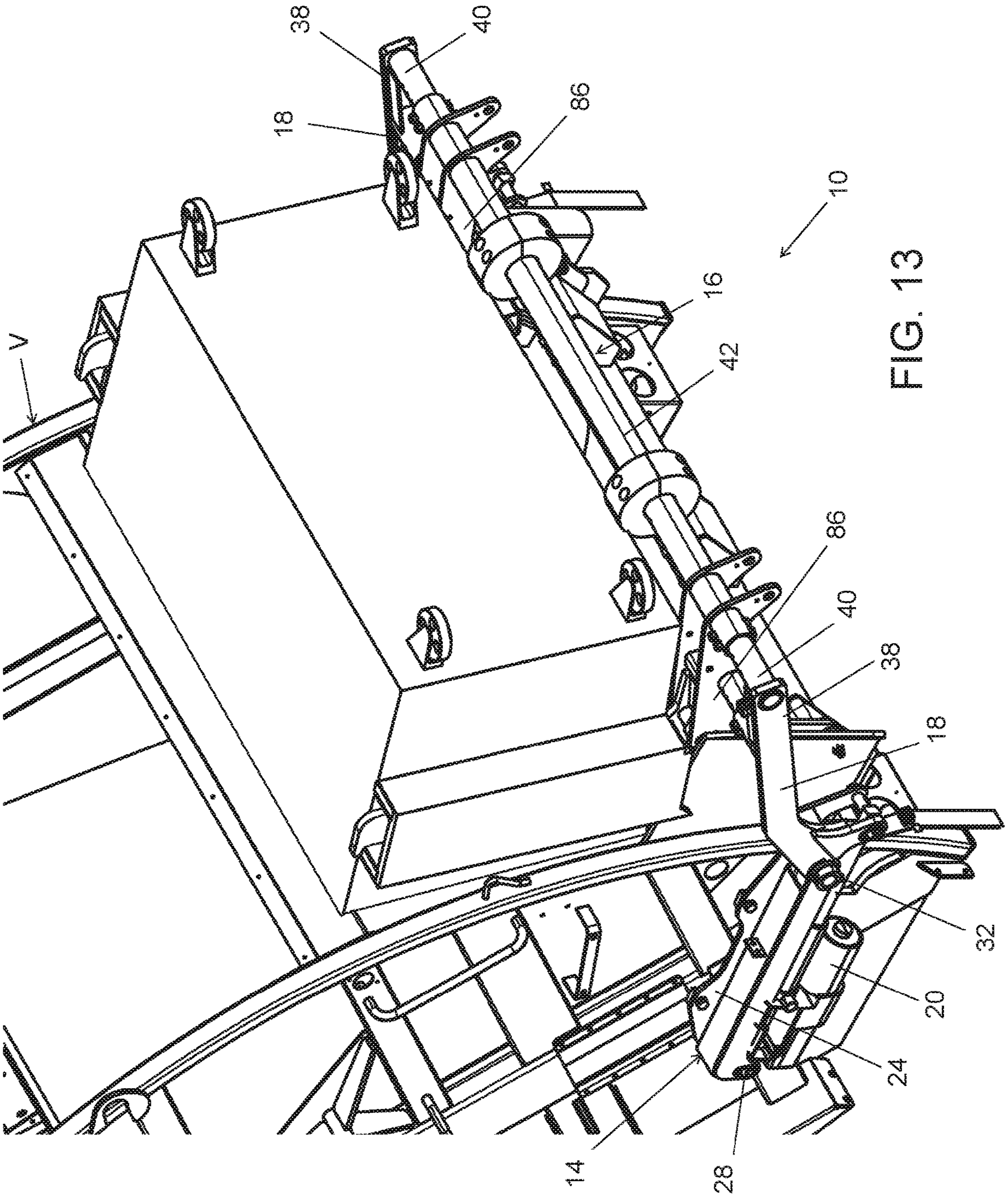
FIG. 13 is a rear perspective view of the Type S container of FIG. 12A-12C being dumped, with the kickbar assembly and optional forks of FIG. 11 in an upper position.

The kickbar assembly 10 may be outfitted with alternative optional additional components to handle refuse containers of different configurations, such as refuse containers having couplings that receive lifting hooks, such as, for example, an ANSI Type S refuse container 112, shown in FIGS. 12A-12C. As seen in FIGS. 11 and 13, the kickbar assembly 10 may further include a pair of lift hooks 84 connected to hook mounts 86 at the respective opposed ends 18 of the lifting implement 16. The lift hooks 84 are configured to be received by couplings 112*a* on opposed sides of the refuse container 112. The hook mounts 86 for the pair of lift hooks 84 may include an angular position adjustment assembly 88 and bumpers 90 for engagement of the refuse container 112 when the hooks 84 engage the couplings 112*a* on the refuse container 112 and the kickbar assembly 10 is actuated to tilt and lift the refuse container 112 to an upper position to dump contents from the refuse container 112.

Figure 14:
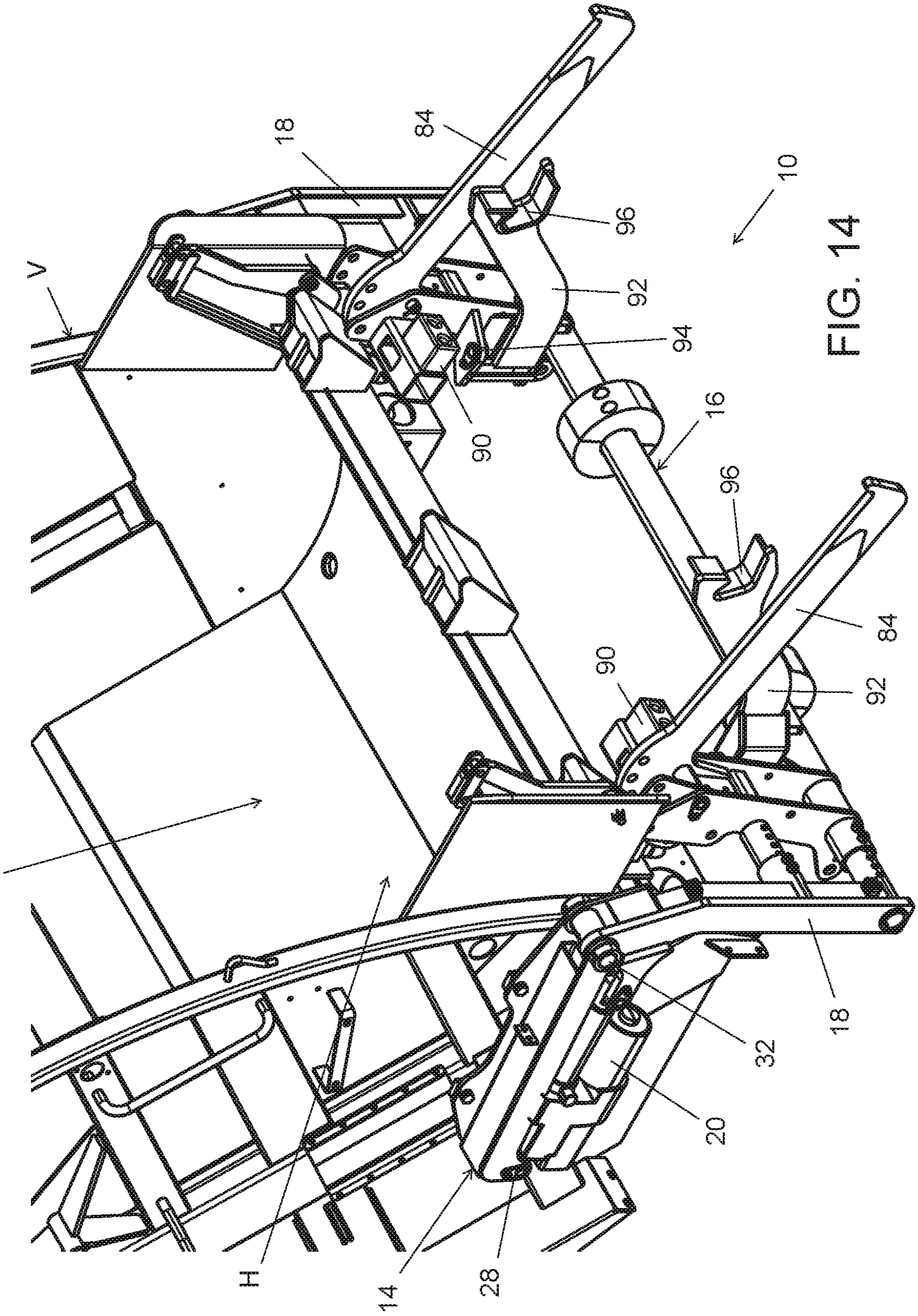
FIG. 14 is a rear perspective view of the example kickbar assembly, rear tailgate and optional forks of FIG. 11, with further optional folding arms for lifting 1100 liter bins having trunnion pins.
Figure 15A:
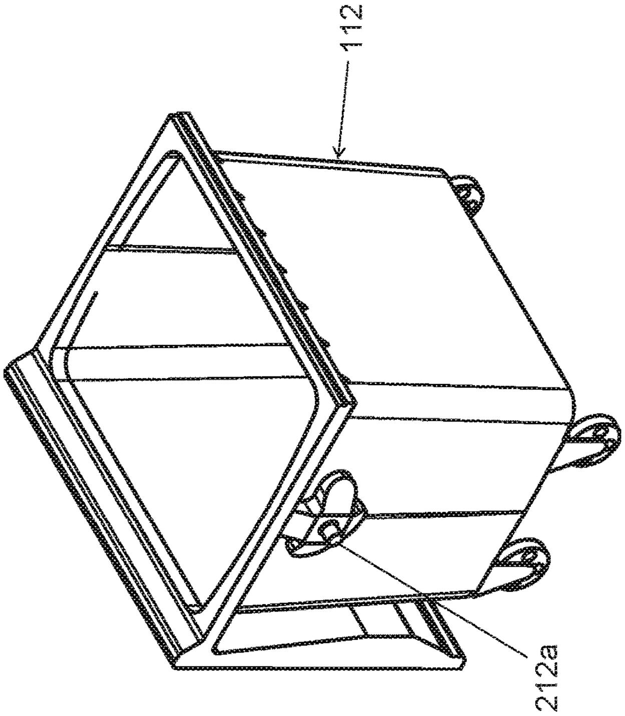
FIG. 15A-15C are front perspective, rear and side views of a typical 1100 liter bin having trunnion pins.
Figure 15C:
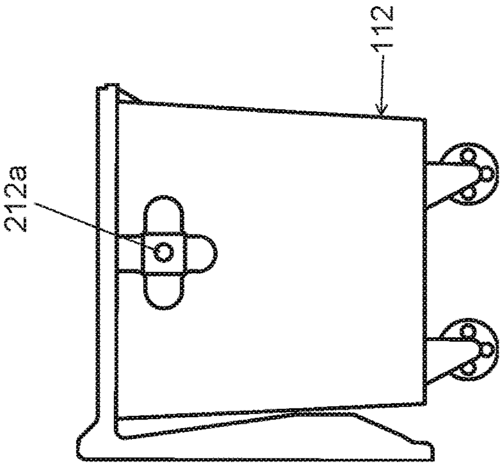
Figure 15B:
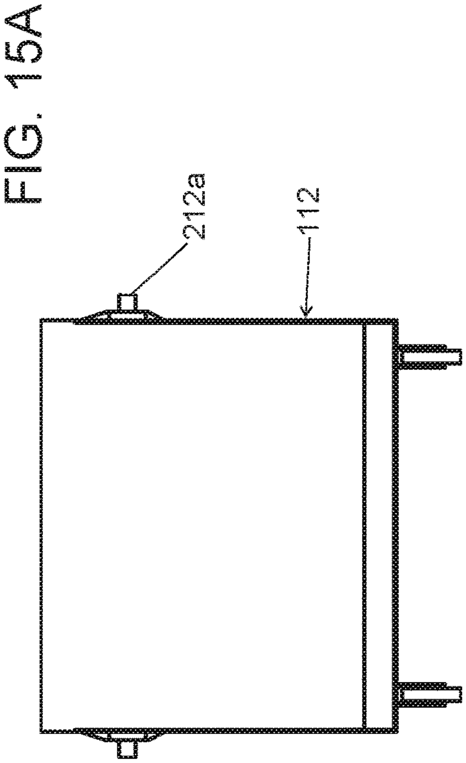
Figure 16:
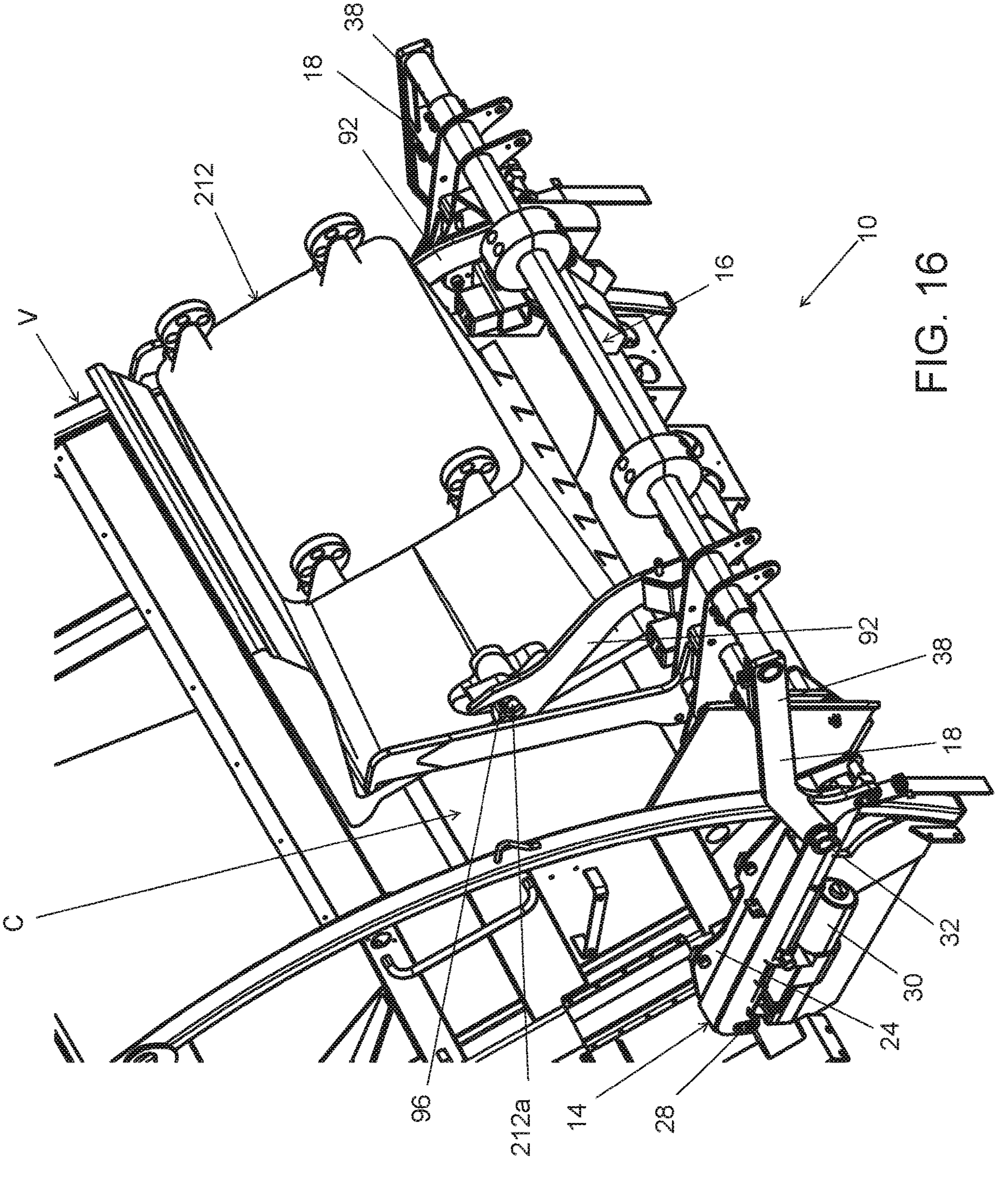
FIG. 16 is a rear perspective view of the 1100 liter bin of FIGS. 15A-15C being dumped, with the kickbar assembly and optional folding arms in an upper position.

Still further alternative components may be utilized as a part of the kickbar assembly 10 to accommodate other refuse containers, such as a refuse container 212 having a pair of trunnion pins 212*a*, such the example an 1100 liter refuse container 212 is shown in FIGS. 15A-15C. As seen in FIGS. 14 and 16, the kickbar assembly 10 may further include a pair of lift arms 92 pivotably coupled to the lifting implement 16 at 94. The lift arms 92 may have pin receivers 96 configured to receive trunnion pins 212*a* located on opposed sides of the refuse container 212.

Thus, the kickbar assembly 10 may be altered to accommodate collection routes that involve alternative containers. For example, the kickbar assembly 10 may be equipped to handle only refuse containers 12 having a trunnion bar, or to additionally handle containers 112 that are lifted by hooks and/or alternatively equipped to additionally handle containers 212 that are lifted by lift arms.

As noted, the embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

The invention claimed is:

1. A kickbar assembly for use in lifting and dumping a refuse container into a hopper of a rear load refuse vehicle, the kickbar assembly comprising:

a pair of base frames configured to be connected to side walls of the refuse vehicle;

an elongated generally U-shaped lifting implement having a pair of opposed ends pivotably connected to the respective base frames;

a pair of electrically powered linear actuators;

each of the linear actuators being pivotably connected to one of the respective base frames and one of the respective opposed ends of the lifting implement;

the lifting implement being pivotably connected to the base;

wherein the linear actuators move the lifting implement from a refuse container engaging lower position to an upper position to dump contents from the refuse container into the hopper, and further move the lifting implement to the lower position to return the refuse container to the ground surface.

2. The kickbar assembly of claim 1, wherein each base frame further comprises an inner mounting plate removably mounted to the respective side wall of the refuse vehicle and being pivotably connected to a front end of the linear actuator and pivotably connected to a proximal end of an opposed end of the lifting implement.

3. The kickbar assembly of claim 2, wherein each base frame further comprises an outer mounting plate being pivotably connected to the front end of the linear actuator and pivotably connected to the proximal end of said opposed end of the lifting implement.

4. The kickbar assembly of claim 3, wherein each base frame further comprises a weldment.

5. The kickbar assembly of claim 1, wherein each opposed end of the lifting implement further comprises a beam pivotably connected at a proximal end to one of the respective base frames and having a distal end fixedly connected to an end of an elongated member.

6. The kickbar assembly of claim 5, wherein each beam at one of the opposed ends of the lifting implement further comprises an extension arm located between the proximal and distal ends of the respective beam, with a rear end of the linear actuator pivotably connected to the extension arm of the beam.

7. The kickbar assembly of claim 6, wherein the rear end of the actuator further comprises a rear end of a movable rod.

8. The kickbar assembly of claim 1, wherein each opposed end of the lifting implement further comprises a beam pivotably connected at a proximal end to one of the respective base frames and having a distal end fixedly connected to an end of an elongated member.

9. The kickbar assembly of claim 1, wherein the electrically powered linear actuator further comprises a ball screw linear actuator.

10. The kickbar assembly of claim 1, further comprises an electrical control system for operating the kickbar assembly and which comprises a controller and an operator interface.

11. The kickbar assembly of claim 10, wherein the electrical control system further comprises a position sensor that determines the position of the lifting implement relative to the base frame during operation of the kickbar assembly.

12. The kickbar assembly of claim 11, wherein the position sensor is connected to the linear actuator.

13. The kickbar assembly of claim 12, wherein the controller further comprises a logic circuit and processor.

14. The kickbar assembly of claim 10, wherein the operator interface further comprises a plurality of electrical inputs associated with controlling the lifting device.

15. The kickbar assembly of claim 14, wherein the electrical inputs further comprise a "Stop" button associated with lifting implement movement commands.

16. The kickbar assembly of claim 14, wherein the electrical inputs further comprise a switch associated with lifting implement movement commands that includes at least "Up" and "Down" positions.

17. The kickbar assembly of claim 16, wherein the electrical inputs further comprise at least one switch to select between at least a manual mode of operation and an automatic mode of operation.

18. The kickbar assembly of claim 17, wherein the electrical control system further comprises a one-touch operation circuit which provides operation of a lifting and dumping cycle of the lifting implement when in the automatic mode.

19. The kickbar assembly of claim 17, wherein when the switch is used to select the automatic mode of operation, a one-touch operation circuit is started by actuation of a switch associated with an "Up" movement command, wherein the lifting implement is moved from a lower position to lift the refuse container from a ground surface to an upper position to dump the refuse container, followed by a pre-selected dwell time in the upper position before returning the refuse container to the ground surface.

20. The kickbar assembly of claim 1, further comprising a trunnion bar receiver connected to the refuse vehicle that receives a trunnion bar of a refuse container when the kickbar assembly is actuated and tilts the refuse container as the lifting implement is moved to the upper position to dump contents from the refuse container.

21. The kickbar assembly of claim 1, further comprising a pair of lift hooks connected to hook mounts at the respective opposed ends of the lifting implement, with the lift hooks being configured to be received by couplings on opposed sides a refuse container.

22. The kickbar assembly of claim 21, wherein the hook mounts for the pair of lift hooks further comprise an angular position adjustment assembly and bumpers for engagement of the refuse container when the hooks engage the couplings on the refuse container and the kickbar assembly is actuated to tilt and lift the refuse container to an upper position to dump contents from the refuse container.

23. The kickbar assembly of claim 1, further comprising a pair of lift arms pivotably coupled to the lifting implement.

24. The kickbar assembly of claim 23, wherein the lift arms further comprise pin receivers configured to receive trunnion pins on a refuse container.

* * * * *